United States Patent [19]

Van Steenburgh, Jr.

[11] Patent Number: 4,689,969

[45] Date of Patent: Sep. 1, 1987

[54] REFRIGERATED GAS SEPARATION APPARATUS

[75] Inventor: Leon R. Van Steenburgh, Jr., Denver, Colo.

[73] Assignee: Wilkerson Corporation, Englewood, Colo.

[21] Appl. No.: 860,135

[22] Filed: May 6, 1986

[51] Int. Cl.⁴ .................................... F25B 43/00
[52] U.S. Cl. .............................. 62/474; 55/192; 55/463; 62/503
[58] Field of Search ............... 62/503, 474, 475; 55/192, 463

[56] References Cited

U.S. PATENT DOCUMENTS

| | | | |
|---|---|---|---|
| 1,055,792 | 3/1913 | Plock | 55/459 |
| 2,432,757 | 12/1947 | Weniger | 55/263 |
| 2,490,502 | 12/1949 | Audibert | 55/268 |
| 3,739,443 | 6/1973 | Friedman | 29/157.3 R |
| 3,789,582 | 2/1974 | Graybill | 55/92 |
| 3,849,095 | 11/1974 | Regehr | 55/394 |
| 4,036,615 | 7/1977 | Heintzelman | 55/442 |
| 4,049,048 | 9/1977 | Leedham | 165/159 |
| 4,081,249 | 3/1978 | Beille | 55/449 |
| 4,175,938 | 11/1979 | Regehr et al. | 55/440 |
| 4,249,596 | 2/1981 | Tutak et al. | 165/113 |
| 4,251,242 | 2/1981 | Ito | 55/242 |
| 4,253,315 | 3/1981 | Fiedler | 62/93 |
| 4,270,934 | 6/1981 | Widdowson et al. | 62/503 |
| 4,276,756 | 7/1981 | Livesay | 62/503 |
| 4,325,171 | 4/1982 | Nobles | 29/157.3 C |
| 4,331,001 | 5/1982 | Jones | 62/503 |
| 4,412,582 | 11/1982 | Melozzi et al. | 165/76 |
| 4,415,024 | 11/1983 | Buher | 165/160 |
| 4,475,360 | 10/1984 | Suefuji et al. | 62/503 |
| 4,554,969 | 11/1985 | Carnavos | 165/154 |

OTHER PUBLICATIONS

"Headstart" brochure, published Circa 1982.
Wilkerson, "Refrigerated Air Dryers" published Circa 1978.

Primary Examiner—Ronald C. Capossela
Attorney, Agent, or Firm—Ralph F. Crandell

[57] ABSTRACT

A refrigerated gas separation apparatus such as a refrigerated dryer for compressed air, includes a conditioner in the form of a shell and tube heat exchanger which cools incoming hot moist compressed air and warms outgoing cold dry air. The cooled moist gas is refrigerated by contact with a refrigeration system evaporator, in the form of a finned baffled coil, and the condensed moisture is removed in a moisture separator including a central conical baffle or shroud and peripheral longitudinal hooked scraper bars or baffles defining channels for collecting moisture and directing the liquid to a sump.

8 Claims, 14 Drawing Figures

Fig_1

Fig_2

Fig_3

Fig_4

Fig_5
Fig_6

Fig_7

Fig_8

Fig_9

Fig_10

Fig_11   Fig_12

Fig_13

Fig. 14

REFRIGERATED GAS SEPARATION APPARATUS

BACKGROUND OF THE INVENTION

1. Field of the Invention

The present invention relates to refrigerated gas separation apparatus and more particularly to refrigerated dryers and separators for removing moisture from compressed air.

2. Prior Art

Refrigerated dryers and moisture separators for removing moisture from compressed air are generally old and well-known in the art. Such apparatus conventionally includes a conditioner or equalizer in the form of a shell and tube heat exchanger for cooling incoming hot, moist compressed air and warming outgoing cold, dried compressed air. The cooled, moist compressed air is then contacted with a refrigeration evaporator which further lowers the temperature of the compressed air, thereby causing moisture to condense for removal in a separator. Condensed moisture is removed and the cold, relatively drier compressed air is directed through the equalizer heat exchanger to cool incoming hot, moist compressed air before being discharged to the utility circuit. The refrigeration evaporator is part of a conventional refrigeration circuit, including a refrigerant compressor, condenser, refrigerant reservoir, expansion valve or orifice, and evaporator.

OBJECTS AND SUMMARY OF THE INVENTION

The principal object of the present invention is to provide an improved refrigerated gas separation apparatus, and more particularly an improved refrigerated dryer for removing moisture from compressed air.

A further object of the present invention is to provide an improved refrigerated cooling and moisture separator device for use in a refrigerated gas dryer.

A further object of the present invention is to provide an evaporator for use in a refrigerated gas dryer, evaporator which has an improved construction facilitating assembly of the unit and reducing the cost thereof.

Still another object of the present invention is to provide an improved moisture separator construction which facilitates the removal of moisture entrained in a cold, compressed gas and prevents the re-entrainment of the moisture into the gas as the latter flows outwardly from the apparatus.

Still a further object of the present invention is to provide an evaporator and moisture separator combination which efficiently cools an incoming compressed moisture-laden gas to effect the removal of moisture therefrom and effectively separate condensed moisture from the flowing gas to produce a relatively dry, cold output gas stream free of entrained liquid.

Other objects and advantages of the present invention will become apparent from the following description and accompanying drawings.

The present invention is embodied in a compressed gas dryer assembly in which warm, moist compressed air flows into a shell and tube heat exchanger or conditioner in heat exchange relation with an output stream of cold, dry air to produce an output of warm, dried air. The incoming moist, warm air is cooled and flows to a refrigerating and moisture separation unit wherein the moist air is cooled to effect moisture separation. Moisture, in the form of liquid droplets, is separated from the cold air in the separator section, the collected liquid being drained through an appropriate outlet, and the cold, relatively dry air flows back to the conditioner in heat exchange relation with the incoming moist, warm compressed air.

The refrigeration apparatus may be a conventional liquid refrigerant type apparatus, including a compressor, a condenser, a receiver and an evaporator. Refrigerant is compressed by the compressor, condensed in the condenser and collects in the collector or receiver. From the receiver, the refrigerant flows through an expansion valve or orifice to the evaporator for cooling purposes. The warmer refrigerant from the evaporator is again compressed and the cycle repeated. Bypass valves may be provided for controlling the temperature of the evaporator and thereby of the material being cooled.

The improved evaporator construction embodying the present invention is in the form of a finned coil, generally rectangular in cross-section, with inserted transverse baffles to provide a transversely tortuous path for air or other gaseous material flowing through the evaporator. The baffled, finned coil is housed in an internal, generally hexagonal shell, which in turn is mounted in a vertical cylindrical housing. The evaporator is located in the upper section and a moisture separator in the lower section of the cylindrical housing. From the evaporator cooler, the air flows downwardly in a generally tangential spiral path through the moisture separator where it is contacted by a plurality of scraper bars or radial baffles to effect removal of liquid from the cooled gas. A conical internal baffle provides an increasingly smaller diameter spiral path to further effect removal of the liquid from the cooled gas.

Collected liquid is drained from the bottom of the cylindrical tank or housing, while the cold, dried gas flows upwardly centrally of the conical baffle and outwardly through an outlet conduit to the shell and tube conditioner.

Appropriate controls may be provided for the refrigeration equipment by measuring temperatures and pressures throughout the apparatus. Because of the complexity of the control parameters, the system is ideally suited for microprocessor control.

DESCRIPTION OF THE PREFERRED EMBODIMENT

Figure 1:
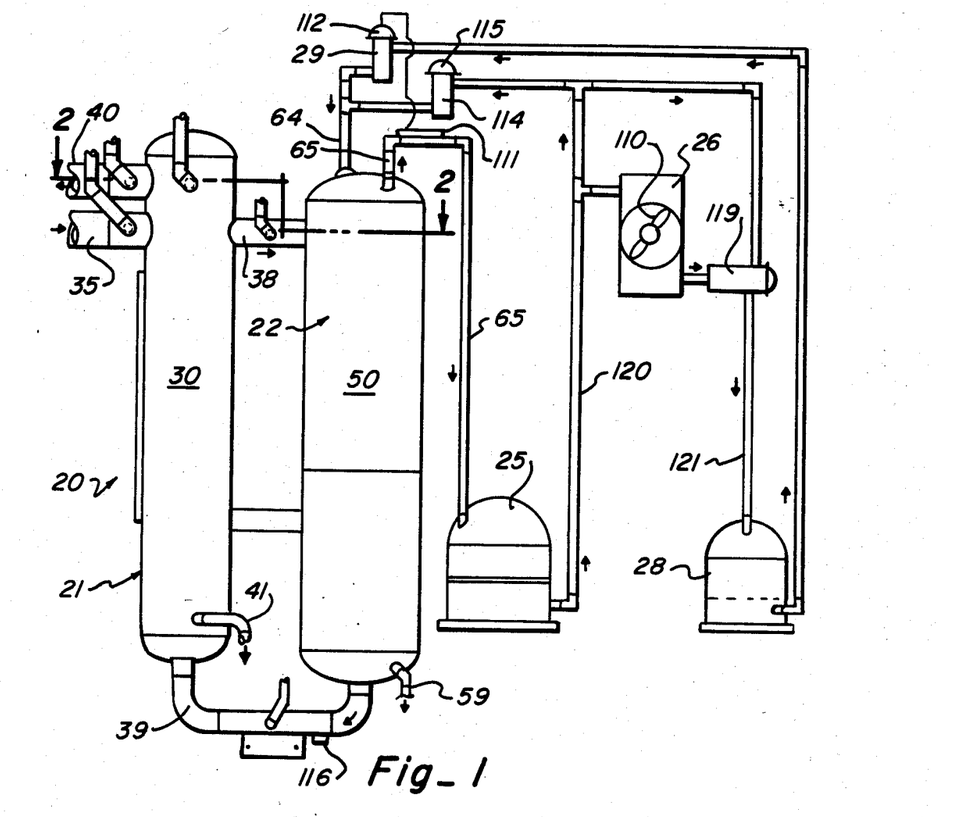
FIG. 1 is an elevation view, partially schematic, of a refrigerated air dryer embodying the present invention.
Figure 2:
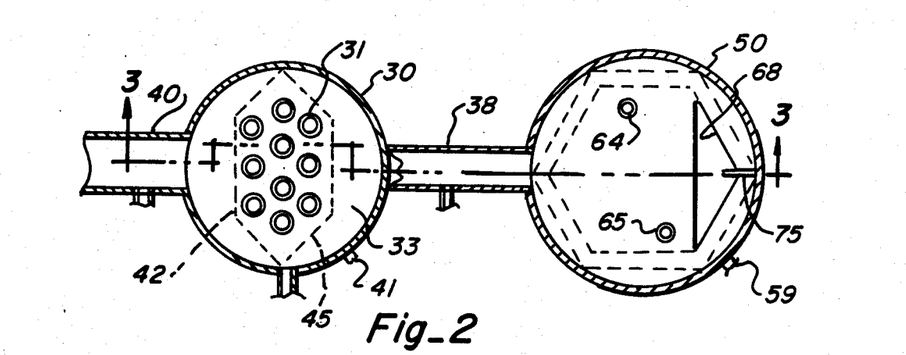
FIG. 2 is an enlarged section view taken substantially in the plane of line 2—2 on FIG. 1.
Figure 3:
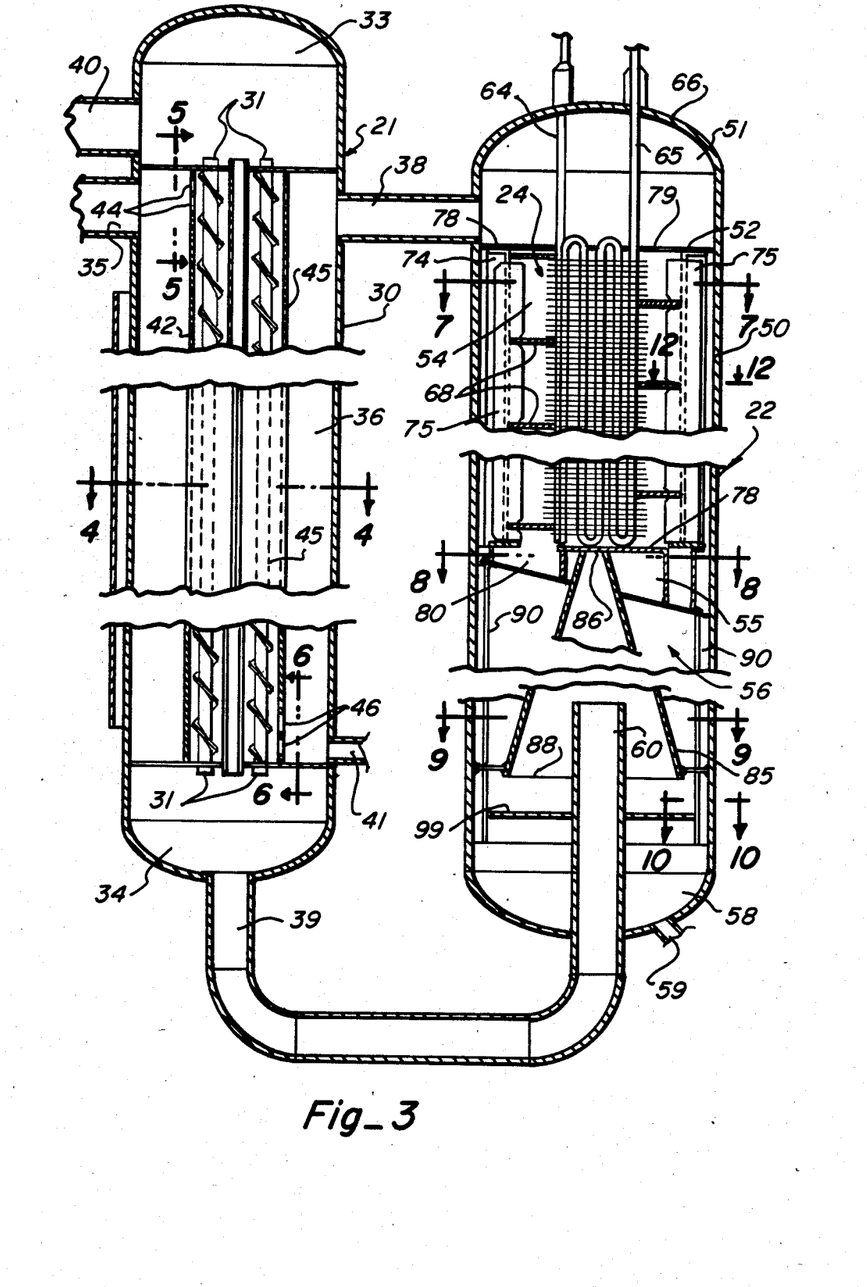
FIG. 3 is a further enlarged section view taken substantially in the plane of line 3—3 on FIG. 2 and showing the conditioner heat exchange apparatus and the refrigeration and moisture separator apparatus embodying the present invention.
Figure 4:
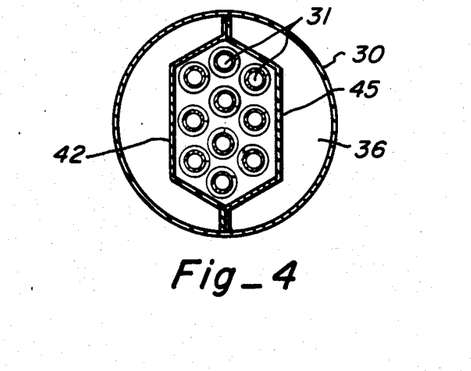
FIG. 4 is a section view taken substantially in the plane of line 4—4 on FIG. 3.
Figure 5:
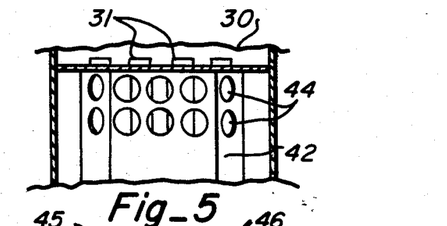
FIG. 5 is a section view taken substantially in the plane of line 5—5 on FIG. 3.
Figure 6:
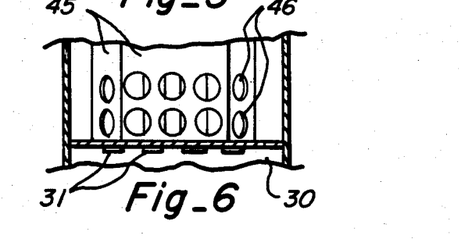
FIG. 6 is a section view taken substantially in the plane of line 6—6 on FIG. 3.
Figure 14:
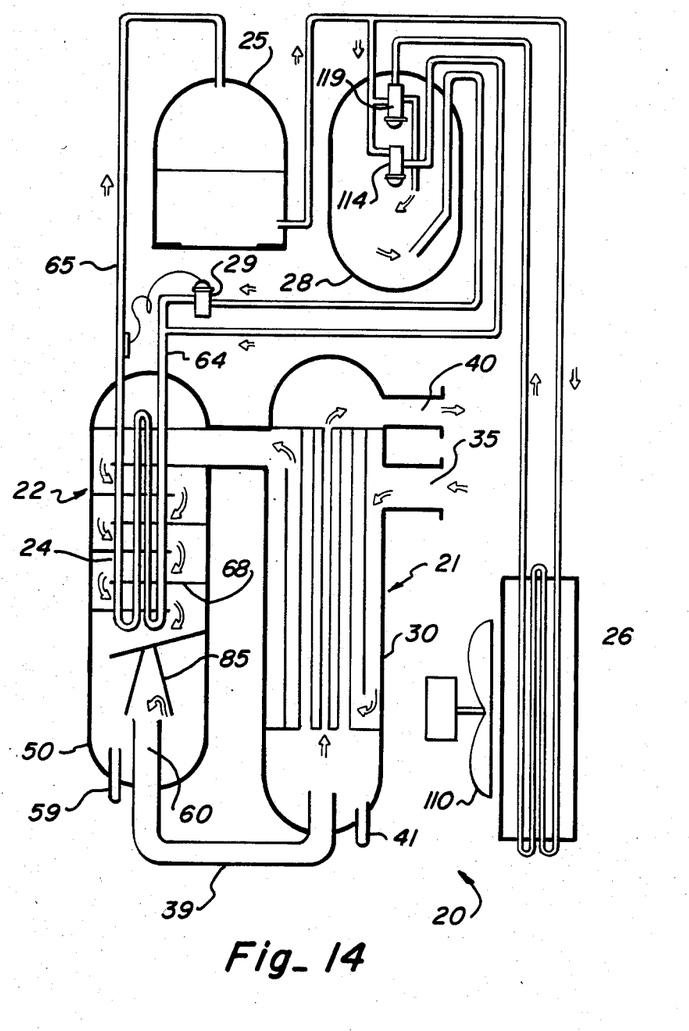
FIG. 14 is a schematic diagram of the apparatus embodying the present invention.

Referring to the drawings, and particularly FIGS. 1, 3 and 14, the present invention is embodied in a refrigerated gas-liquid separation apparatus 20 such as a refrigerated dryer for compressed air. The apparatus includes a shell and tube type heat exchanger or conditioner 21 for conditioning incoming moist, warm air by heat exchange with cold, relatively drier air prior to discharge of the dry air to the system or point of use thereof. The relatively cooled, moist air is further cooled and dried in a refrigeration evaporator and moisture separator unit 22 wherein the air is cooled and dried and liquid water is removed from the system. A refrigeration system includes the evaporator 24 which forms a part of a refrigeration system including a compressor 25, a condenser 26, a refrigerant collector or receiver 28, and an expansion valve or orifice 29, in series with the evaporator 24. The refrigeration system provides a refrigerated evaporator or heat exchanger for controllably chilling incoming moist air to effect the removal of moisture therefrom, thereby drying the compressed air. While particular reference will be made to the drying of compressed air in connection with the description of the present apparatus, it should be understood that the apparatus is equally useful for the separation of gases or the removal of liquids from gases by chilling or cooling the gas to effect condensation and separation of a component thereof.

Turning first to the heat exchanger or conditioner 21, shown in detail in FIG. 3, the heat exchanger is a conventional shell and tube type heat exchanger formed by a cylindrical housing or shell 30 with a plurality of internal tubes 31 opening into end chambers 33 and 34, respectively. Incoming hot, moist compressed air flows through inlet port 35 into the shell in surrounding relation with the tubes 31. The air flows longitudinally along and around the tubes 31, into an outlet chamber 36 and outlet conduit 38. The incoming air flows in heat exchange relation with cold, relatively drier gas flowing through the inlet conduit 39 and inlet chamber 34, into and through the tubes 31 to the outlet chamber 33, and thence through the outlet 40 to the point of use. The heat exchanger tubes 31 may have any desired surface configuration, such as the spiral configuration illustrated in FIG. 3, in order to enhance the heat transfer relationship between the relatively cold air flowing through the tubes and the relatively warmer air flowing through the shell. Moisture collected in the shell portion of the conditioner is discharged through an appropriate discharge port 41 which may, if desired, be under the control of an outlet valve (not shown). The shell and tube heat exchanger 21 is provided with appropriate longitudinal baffles, including an inlet baffle 42 having inlet ports 44 for directing the warm, moist air to the vicinity of the tubes, and an outlet baffle 45 having outlet ports 46 through which air flows from contact with the tubes 31 into the outlet chamber 36.

Relatively cooler, moist air flows through the outlet conduit 38 to the refrigeration cooler and moisture separator unit 22 wherein the moist air is supercooled to effect the removal of moisture therefrom. The moisture is removed by condensation and collected for discharge. The relatively supercooled dry air flows through conduit 39 into the shell section of the shell and tube conditioner as described above.

The refrigerated cooler and moisture separator unit 22 is defined by a generally cylindrical housing 50 having an upper air inlet section 51 defined by the upper end of the cylinder 50 and an internal partition or baffle 52, into which section 51 cold, moist air flows from the conditioner outlet conduit 38.

Below the inlet section 51 there is defined a cooling section 54 in which is located a refrigerant system evaporator 24. Through an appropriate baffle arrangement, the moist air traverses the evaporator 24 and is thereby superchilled to effect the removal of moisture therefrom. The cooled, moisture-laden air then flows through a transition section 55 in which it is directed in a generally spiral, tangential path into the moisture separator 56 in which moisture is removed from the supercooled air and flows to a sump 58 defined in the lower end of the housing 50. The collected moisture is removed from the sump 58 through a discharge conduit 59. Discharge of liquid from the unit through the discharge conduit 59 may be under the control of an appropriate valve (not shown). From the separator 56, cold, dry air is removed through an outlet conduit 60 connected to the discharge conduit 39, through which it is introduced into the tube section of the conditioner 21.

The refrigeration evaporator unit 24, mounted in the cooling section 54, comprises a generally rectangular, finned refrigerant coil formed by a multipass refrigerant conduit 61 and a plurality of fins 62 formed of thin metal sheet integrally fastened to the coil tubes 61. The refrigerant coil has a refrigerant inlet conduit 64 and an outlet conduit 65 both of which extend through the upper end wall 66 of the cylindrical housing 50. The fins 62 being in heat exchange contact with the coiled refrigerant tubes 61, provide a large area for heat exchange relationship with the incoming air.

Figure 13:
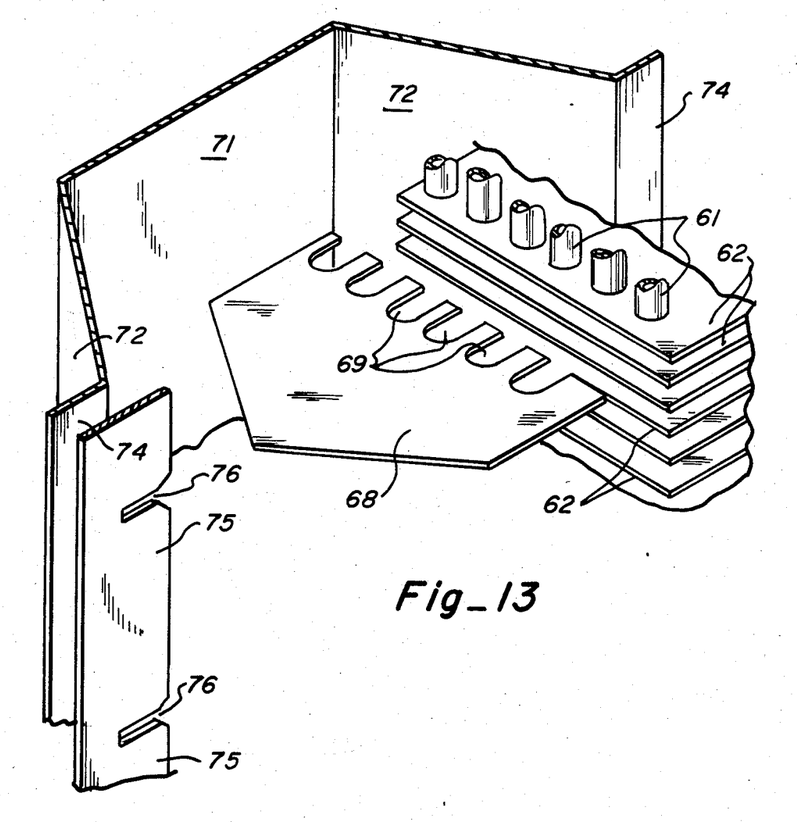
FIG. 13 is an enlarged isometric exploded view of the refrigeration evaporator finned coil and baffle assembly shown in FIG. 3.

In order to direct the incoming air across the fins 62 in a generally transverse zig-zag path, a plurality of spaced baffles 68 are inserted at selectively spaced points between the fins. The baffles 68 are provided with notches 69 for receiving corresponding refrigerant tubes 61 when the baffles 68 are inserted in place between the fins, as shown in FIGS. 3, 7 and 13.

Figure 7:
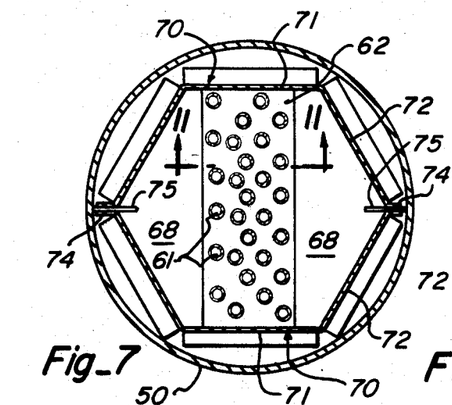
FIG. 7 is a section view taken substantially in the plane of line 7—7 on FIG. 3.

At their outer edges, the baffles 68 are generally triangular or gabled in configuration to provide, when inserted within the generally rectangular finned coil, a hexagonal configuration as shown in FIG. 7. The coil and inserted baffles are housed within an internal, generally hexagonal, housing formed by a pair of three-sided housing panels 70, each such housing panel having a vase panel 71 with a pair of adjoining, sloping side panels 72, each terminating in an outwardly directed sealing fin or strip 74. When two such housing panels are placed together surrounding the finned and baffled coil with their respective sealing fins or strips in juxtaposed relation, a generally hexagonal housing is produced.

Figure 12:
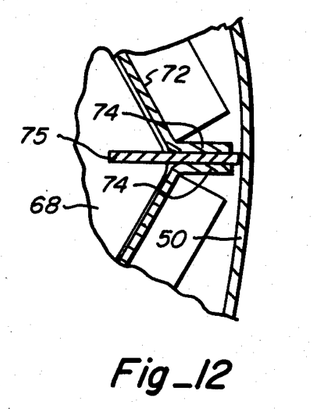
FIG. 12 is an enlarged section view taken substantially in the plane of line 12—12 on FIG. 3.

For supporting the baffles, a notched sealing strip 75 having appropriate notches 76 for receiving an inserted edge of a baffle 68, are positioned between the juxtaposed longitudinal sealing fins or strips 74. When so assembled, the units are welded together by spot welding or otherwise securing the housing units with their sealing fins or strips 74 adjacent the insert strips 75. The entire assembled hexagonal housing can then be readily inserted within the cylindrical housing 50 and sealed therein by the use of appropriate circular panels 78 at each end thereof, as shown in FIG. 12.

Figure 8:
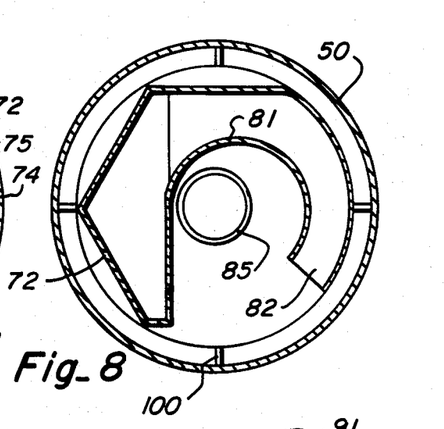
FIG. 8 is a section view taken substantially in the plane of line 8—8 on FIG. 3.

An inlet passage 79 is provided at the upper end of the finned coil and baffle assembly, while an outlet passage 80 is provided at the lower end. Also at the lower end of the assembly there is provided a sheet metal conduit or horn as shown in FIG. 8 providing a generally tangential outlet path or passage 82 for directing the flow of air tangentially into the separator section in a generally spiral path.

For maintaining the air flow in a generally spiral path through a successively narrowing annular passage, there is provided a central conical baffle 85 positioned axially within the separator section and extending from an apex end 86 adjacent the cooling unit to a base end 88 adjacent the moisture sump 58. The outlet conduit 60 extends axially upwardly within the conical baffle 85, through the base and thereof, as shown in FIG. 3, to prevent the entrainment of liquid into the cold, dried outlet gas.

Figure 9:
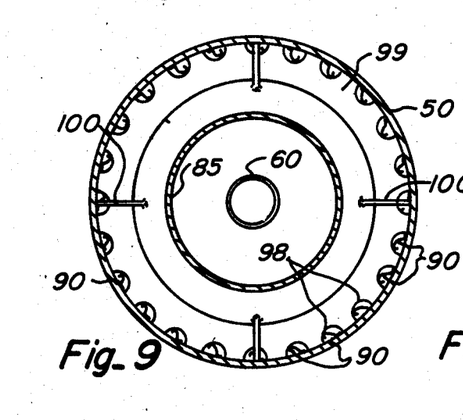
FIG. 9 is a section view taken substantially in the plane of line 9—9 on FIG. 3.
Figure 10:
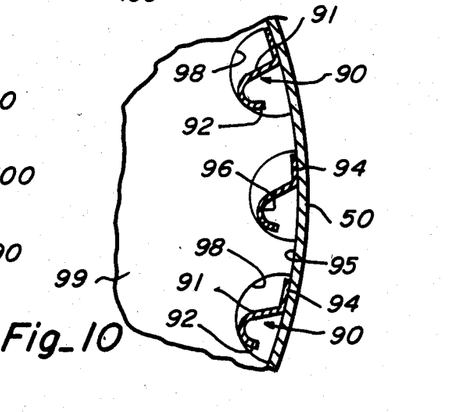
FIG. 10 is an enlarged section view taken substantially in the plane of line 10—10 on FIG. 3.
Figure 11:
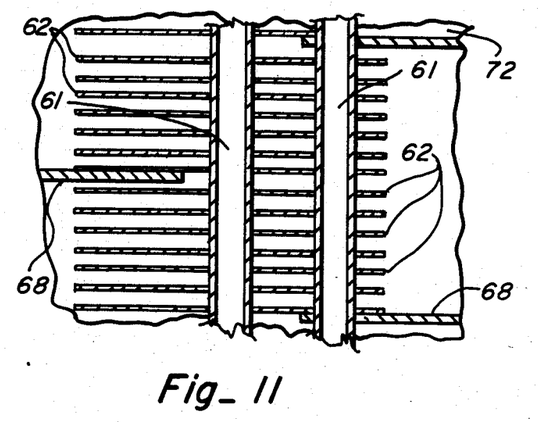
FIG. 11 is an enlarged section view taken substantially in the plane of line 11—11 on FIG. 7.

For effecting efficient removal of liquid from the spirally flowing cold gas, a plurality of longitudinally extending peripherally mounted scraper blades 90 are secured to the internal surface of the moisture separator section 56 of the housing 50, the scraper blades 90 being generally coextensive in length with the central conical baffle 85. Referring to FIGS. 9 and 10, the scraper blades 90 comprise an elongated strip which is hooked in cross-section, defining a radially inwardly extending leg 91, terminating at its innermost end in a reverse hook 92. At the opposite end from the hook, the blade is formed with a mounting leg 94 which is adapted to be secured to the internal surface 95 of the housing wall 50. The hook extends towards the direction of air flow, and thereby provides a turbulent area with a contained channel 96 for collecting moisture from the swirling air. Moisture runs down the channel 96 through an arcuate opening 98 in the peripheral edge of a bottom panel 99 separating the moisture removal section from the moisture sump, as shown in FIGS. 9 and 10. Adjacent its lower end, the central conical baffle 85 is secured to the wall of the housing 50 by appropriate braces 100.

As can be observed from the foregoing, incoming cool, moisture-laden air flows through inlet passage 38 into the inlet chamber 51 of the housing 50, and thence in a zig-zag path through the baffled refrigeration evaporator finned coil, wherein the gas is cooled to effect condensation of moisture or other component therefrom. From the evaporator cooler, the moisture-laden gas flows through the outlet 82 of the spiral or horn shaped channel 81 tangentially into the separator section where it flows in a continuous turbulent spiral path defined by the central conical baffle 85 and impinges on the scraper blades 90 to effect the efficient removal from the gas of moisture or other condensable component. As the moisture condenses, it flows into the sump 58 for removal through the outlet port 59, while the dried, supercooled gas flows upwardly internally of the conical baffle and then outwardly through the outlet port 60 and through conduit 39 to the conditioner or shell and tube heat exchanger for conditioning the incoming warm, moist air.

The refrigeration circuit is shown in alternative forms in FIGS. 1 and 14. The refrigeration circuit itself is basically a conventional circuit including the evaporator 24 described above, in series with the compressor 25, condenser 26, receiver 28, and expansion valve 29, preceeding the evaporator 24. The condenser may include a fan 110. The orifice or expansion valve 29 is controlled generally according to the temperature of the refrigerant in the outlet conduit 65 from the evaporator, by means of a thermostat 111 secured to the outlet line 65 and controlling a valve operator 112 on the expansion valve.

For purposes of controlling the temperature of the evaporator, it may, under some circumstances, be appropriate to direct hot compressed refrigerant directly from the compressor to the evaporator inlet hot gas line 64 bypassing the expansion valve 29. For this purpose, a bypass valve 114 is provided biased by a pneumetic valve operator 115. The pneumatic pressure on the bypass valve may be stabilized by the temperature of the output air, using a thermostat 116 in operative, functional relationship to the cold air outlet conduit 39. To facilitate starting and operation under low ambient temperature conditions, it may be desirable to bypass the condenser, and for this purpose a compressor refrigerant control valve 119 controls the flow of refrigerant from the compressor outlet line 120 directly to the receiver through the condenser output line 121, bypassing the condenser 112.

In an alternative refrigeration circuit shown in FIG. 14, the bypass valve 114 and a condenser bypass valve 119 may be housed within the receiver 28, thereby maintaining a uniform surrounding temperature and pressure on the valves and freeing the valves from the variations in atmospheric temperatures and pressures surrounding the entire equipment. The enclosed bypass valves 114 and 119, as shown in FIG. 14 operate as a function of refrigerant pressure in the compressor output line 120 and internal pressure in the receiver 28, in the case of the condensor bypass valve 119, and as a function of refrigerant pressure in the evaporator 24 in the case of the hot gas bypass valve 114. The bypass valves are pressure biased diaphragm type valves which are hermetically sealed in the receiver. In this manner, the valves are isolated from changing external temperatures and barometric pressure.

Refrigerated gas separation apparatus of the foregoing character, such as dryers for compressed air, may include various monitoring displays. Monitors may be provided to display ambient air temperature, refrigerant compressor discharge temperature, evaporator refrigerant temperature, inlet air pressure, outlet air pressure, and outlet air temperature. Air flow through the unit may be monitored and displayed directly or as a percentage of capacity. Air flow may be monitored by a hot wire anemometer or by a positive coefficient thermistor in a balancing circuit which includes a positive coefficient thermistor to compensate for no-flow temperature changes and a negative coefficient thermistor to compensate for full flow temperature changes. Air dew point indicators may also be utilized. All of the various parameters may be utilized to generate signals which are in turn fed to a microprocessor which provides control signals for the system.

While a certain illustrative embodiment of the present invention has been shown in the drawings and described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

I claim:

1. In a refrigerated dryer for compressed air, a refrigeration evaporator and moisture separation unit comprising, in combination, a vertical, cylindrical housing having in longitudinal alignment an air cooler section and a moisture separator section, means at one end of said housing defining an air inlet chamber, means at the other end of said housing defining a moisture sump, an outlet drain for draining said sump, a refrigeration evaporator heat exchanger in said air cooler section, said heat exchanger comprising a finned tube refrigeration system evaporator, said evaporator having adjacent inlet and outlet conduits for connection with a refrigeration system, a plurality of baffle plates inserted between said fins at spaced intervals alternating on opposite sides of said finned tube assembly for channeling air transversly across said finned tube evaporator, a generally hexagonal housing enclosing said evaporator and inserted baffles to provide an internal cooling chamber, said hexagonal housing having generally circular end panels for mounting said hexagonal housing within said outer cylindrical housing, said end panels having openings for the passage of compressed air therethrough, said hexagonal housing being formed in two sections, each having three angularly disposed wall panels and opposed longitudinal seam panels on the outer edges of the wall panels, a pair of longitudinal spacer strips for holding said baffles in spaced relation, a spacer strip and a pair of juxtaposed seam panels being secured together to form the side seams of the hexagonal housing when said wall panel sections are mounted together in evaporator enclosing arrangement, an air flow directing outlet nozzle on the outlet end panel of said hexagonal housing, said nozzle being eccentrically positioned to provide a generally tangential air outlet flow pattern from said evaporator cooling section into said moisture separator section, a downwardly opening conical baffle extending axially centrally within said moisture separator section and extending axially from said cooler section to a point adjacent said sump, the larger end of said baffle opening above said sump, an air outlet conduit extending from the lower end of said cylindrical housing upwardly into said conical baffle, said baffle and conduit being positioned to prevent the passage of liquid into said outlet conduit, a plurality of longitudinally extending scraper bars secured to the internal surface of said cylindrical housing within said moisture separator section, said scraper bars having a hooked edge extending radially inwardly of said cylindrical housing with the hook extending towards the direction of air flow for interrupting said air flow and creating turbulence to effect the removal from said air of moisture condensed therein and a sump cover plate in the lower end of said separator section including arcuate notches in the peripheral edge thereof for receiving corresponding inserted ends of said scraper bars for directing moisture into said sump, whereby incoming moisture-laden gas is cooled by said evaporator and condensed liquid is removed therefrom by said swirling movement and scraper bars to produce a cold, dry gas output through said outlet conduit.

2. In a refrigerated dryer for compressed air, a refrigeration cooling and moisture separator device comprising, in combination, a generally vertical closed cyclindrical housing, a partition defining an air inlet chamber at the upper end thereof, an annular partition defining a moisture collection chamber at the lower end thereof, a compressed air inlet opening into said inlet chamber, a liquid drain opening out of the moisture collection chamber, means defining an air outlet comprising a centrally extending conduit extending through said moisture collection chamber and partially into the cylindrical housing, a conical baffle extending over said air outlet with the larger end thereof adjacent said moisture collection chamber, means separating said housing into an upper refrigeration chamber and a lower moisture separation chamber, a finned coil refrigeration unit in said refrigeration chamber, the refrigeration coils extending through said housing for connection with a refrigeration unit, a plurality of radially extending baffles providing transverse air flow channels across said finned refrigeration unit, said baffles being inserted between fins of said finned refrigeration coils and having notches in the inserted edge thereof for releaseably engaging said refrigeration coils, an interior housing inclosing said finned refrigeration coils and baffles, means defining an air inlet port opening into said interior housing and means defining an air outlet port opening out of said interior housing, said housing being generally hexagonal in configuration, an air outlet chamber from said interior housing defining an air outlet nozzle projecting generally tangentially interiorally of said moisture separation chamber for direction cold moisture-laden air tangentially in a swirling direction into said moisture separation chamber, a plurality of longitudinally extending spaced scraper bars mounted on the interior peripheral walls of said housing within said moisture separation chamber, each of said scraper bars having a hooked edge defining a channel opening in opposition to the flow of moisture-laden air for stripping moisture from said air and directing said moisture into the said moisture collection chamber as said air swirls in said moisture separation chamber, said conical baffle being positioned within said moisture separation chamber, the upper end of said conical baffle being supported in said moisture separation chamber for preventing the passage of moisture into the air outlet conduit whereby warm moisture-laden air is cooled by said refrigeration unit and said cold moisture-laden air is swirled in said separation unit to separate moisture therefrom and provide cold, relatively drier air at the outlet thereof.

3. The dryer as defined in claim 2 wherein said scraper bars comprise in cross-section a mounting leg adapted for attachment to the internal wall surface of said chamber and a generally laterally extending hook adapted to extend radially inwardly of said chamber and defining a moisture collection channel extending longitudinally of said scraper bar.

4. In a refrigerated dryer for compressed air, a refrigeration evaporator unit comprising a vertical, cylindrical housing means at one end of said housing defining an air inlet chamber, a refrigeration evaporator heat exchanger in said housing, said heat exchanger comprising a finned tube refrigeration system evaporator, said evaporator having adjacent inlet and outlet conduits for connection with a refrigeration system, a plurality of baffle plates inserted between said fins at spaced intervals alternating on opposite sides of said finned tube assembly for channeling air transversly across said finned tube evaporator, a generally hexagonal housing enclosing said evaporator and inserted baffles to provide an internal cooling chamber, said hexagonal housing having generally circular end panels for sealably mounting said hexagonal housing within said outer cylindrical housing, said end panels having openings for the passage of compressed air therethrough, said hexagonal housing being formed in two sections, each having three angularly disposed wall panels and opposed longitudinal seam panels on the outer edges of the wall panels, a pair of longitudinal spacer strips for holding said baffles in spaced relation, a spacer strip and a pair of juxtaposed seam panels being secured together to form the side seam of the hexagonal housing when said wall panel sections are mounted together in evaporator enclosing arrangement, and an air flow directing outlet nozzle on the outlet end panel of said hexagonal housing, said nozzle being eccentrically positioned to provide a generally tangential air outlet flow pattern from said evaporator cooling section.

5. In a refrigerated dryer for compressed air, a moisture separation unit comprising a vertical, cylindrical housing means at one end of said housing, defining a tangential air inlet, means at the other end of said housing defining a moisture sump, a downwardly opening conical baffle extending axially centrally within said housing and extending axially from said inlet to a point adjacent said sump, the larger end of said baffle opening above said sump, an air outlet conduit extending from the lower end of said cylindrical housing upwardly into said conical baffle, said baffle and conduit being positioned to prevent the passage of liquid into said outlet conduit, a plurality of longitudinally extending scraper bars secured to the internal surface of said cylindrical housing within said housing, said scraper bars having a hooked edge extending radially inwardly of said cylindrical housing with said hooked edge facing in the direction of air flow for interrupting said air flow and creating turbulence to effect the removal from said air of moisture condensed therein, and a sump cover plate in the lower end of said separator section including arcuate notches in the peripheral edge thereof for receiving corresponding inserted ends of said scraper bars for directing moisture into said sump.

6. In a refrigerated dryer for compressed air, a refrigeration cooling and moisture separator device comprising, in combination, a generally vertical closed cylindrical housing, a partition defining an air inlet chamber at the upper end thereof, an annular partition defining a moisture collection chamber at the lower end thereof, a compressed air inlet opening into said inlet chamber, a liquid outlet opening out of the moisture collection chamber, means defining an air outlet comprising a centrally extending conduit extending through said moisture collection chamber and partially into the cylindrical housing, a conical baffle extending over said air outlet with the larger end thereof adjacent said moisture collection chamber, means separating said housing into an upper refrigeration chamber and a lower moisture separation chamber, a finned coil refrigeration unit in said refrigeration chamber, the refrigeration coils extending through said housing for connection with a refrigeration unit, means defining a mozzle projecting generally tangentially interiorally of said moisture separation chamber for directing cold moisture-laden air tangentially in a swirling direction into said moisture separation chamber, a plurality of longitudinally extending spaced scraper bars mounted on the interior peripheral walls of said housing within said moisture separation chamber, each of said scraper bars having a hooked edge defining a channel, said hooked edge facing in opposition to the flow of moisture-laden air for stripping moisture from said air and directing said moisture into the said moisture collection chamber as said air swirls in said moisture separation chamber, said conical baffle being positioned within said moisture separation chamber, the upper end of said conical baffle being supported in said moisture separation chamber for preventing the passage of moisture into the air outlet conduit whereby warm moisture-laden air is cooled by said refrigeration unit and said cold moisture-laden air is swirled in said separation unit to separate moisture therefrom and provide cold, relatively drier air at the outlet thereof.

7. The dryer as defined in claim 6 wherein said scraper bars comprise in cross-section a mounting leg adapted for securing to the internal wall surface of said chamber and a generally laterally extending hook adapted to extend radially inwardly of said chamber and defining a moisture collection channel extending longitudinally of each said scraper bar.

8. In a refrigerated dryer for compressed air, a refrigeration cooling and moisture separation device compressing, in combination, a generally vertical closed cyclindrical housing, a partition defining an air inlet chamber at the upper end thereof, an annular partition defining a moisture collection chamber at the lower end thereof, a compressed air inlet opening into said inlet chamber, a liquid outlet opening out of the moisture collection chamnber, means defining an air outlet comprising a centrally extending conduit extending through said moisture collection chamber and partially into the cylindrical housing, a conical baffle extending over said air outlet with the larger end thereof adjacent said moisture collection chamber, means separating said housing into an upper refrigeration chamber and a lower moisture separation chamber, a finned coil refrigeration unit in said refrigeration chamber, the refrigeration coils extending through same housing for connection with a refrigeration unit, a plurality of radially extending baffles providing transverse air flow channels across said finned refrigeration unit, said baffles being inserted between fins of said finned refrigeration coils and having notches in the inserted edge thereof for releaseably engaging said refrigeration coils, an interior housing inclosing said finned refrigeration coils and baffles, means defining an air inlet port opening into said interior housing and means defining an air outlet port opening out of said interior housing, said housing being generally hexagonal in configuration, an air outlet chamber from said interior housing defining an air outlet nozzle projecting generally tangentially interiorally of said moisture separation chamber for directing cold moisture-laden air tangentially in a swirling direction into said moisture separation chamber, said conical baffle being positioned within said moisture separation chamber, the upper end of said conical baffle being supported in said moisture separation chamber for preventing the passage of moisture into the air outlet conduit whereby warm moisture-laden air is cooled by said refrigeration unit and said cold moisture-laden air is swirled in said separation unit to separate moisture therefrom and provide cold, relatively drier air at the outlet thereof.

* * * * *